United States Patent
Mastin et al.

(10) Patent No.: US 9,550,147 B2
(45) Date of Patent: Jan. 24, 2017

(54) PARTICULATE, HETEROGENEOUS SOLID $CO_2$ ABSORBENT COMPOSITION, METHOD FOR ITS PREPARATION AND USE THEREOF

(75) Inventors: Johann Mastin, Oslo (NO); Julien Meyer, Oslo (NO); Arne Raaheim, Nannestad (NO)

(73) Assignee: INSTITUTT FOR ENERGITEKNIKK, Kjeller (NO)

( * ) Notice: Subject to any disclaimer, the term of this patent is extended or adjusted under 35 U.S.C. 154(b) by 1368 days.

(21) Appl. No.: 13/382,919

(22) PCT Filed: Jul. 6, 2010

(86) PCT No.: PCT/NO2010/000272
§ 371 (c)(1),
(2), (4) Date: Feb. 14, 2012

(87) PCT Pub. No.: WO2011/005114
PCT Pub. Date: Jan. 13, 2011

(65) Prior Publication Data
US 2012/0134906 A1    May 31, 2012

(30) Foreign Application Priority Data
Jul. 7, 2009  (NO) .................................. 20092579

(51) Int. Cl.
*B01D 53/02* (2006.01)
*B01D 53/62* (2006.01)
(Continued)

(52) U.S. Cl.
CPC .............. *B01D 53/62* (2013.01); *B01D 53/02* (2013.01); *B01J 20/041* (2013.01); *B01J 20/08* (2013.01);
(Continued)

(58) Field of Classification Search
CPC ... B01D 53/02; B01D 53/62; B01D 2251/404; B01D 2253/104; B01D 2253/1124; B01D 2253/25; B01D 2257/504; B01J 20/08; B01J 20/041; B01J 20/3035; B01J 20/3078; B01J 20/3204; B01J 20/3236; B01J 20/3433; B01J 20/3483; B01J 2251/404; B01J 2253/104; B01J 2253/1124; B01J 2253/25; B01J 2257/504; B01J 2220/56; B01J 2220/4806; C01F 11/04; C01F 7/164; C01P 2004/03; C01P 2004/32; C01P 2004/62; C01P 2004/82; C01P 2004/84; C01P 2002/72; C01P 2002/85; C01P 2002/88; Y02C 10/04; Y02C 10/06; Y02C 10/08
See application file for complete search history.

(56) References Cited

U.S. PATENT DOCUMENTS

2010/0196259 A1* 8/2010 Garg et al. .................... 423/651

OTHER PUBLICATIONS

Li, Z.-S. et al., "Effect of Preparation Temperature on Cyclic CO2 Capture and Multiple Carbonation-Calcination Cycles for a New Ca-Based CO2 Sorbent." Ind. Eng. Chem.Res. 2006, vol. 45, pp. 1911-1917 (published on Web on Feb. 21, 2006).*

(Continued)

Primary Examiner — Daniel Berns
(74) Attorney, Agent, or Firm — Ladas & Parry LLP

(57) ABSTRACT

A particulate, heterogeneous solid $CO_2$ absorbent composition, comprising decomposition products of $Ca_3Al_2O_6$ after having been heated to a temperature between 500° C. and 925° C. in the presence of $H_2O$ and $CO_2$ for a period of time sufficient to allow the $Ca_3Al_2O_6$ to react and form the particulate, heterogeneous absorbent composition which exhibits a higher concentration of aluminum than calcium in the particle core but a higher concentration of calcium than (Continued)

aluminum at the particle surface. The invention also comprises a method for preparing the particulate, heterogeneous product as well as a method for utilizing the composition for separating $CO_2$ from a process gas.

11 Claims, 9 Drawing Sheets

(51) Int. Cl.
    *C01F 11/04*     (2006.01)
    *C01F 7/16*     (2006.01)
    *B01J 20/04*     (2006.01)
    *B01J 20/08*     (2006.01)
    *B01J 20/30*     (2006.01)
    *B01J 20/32*     (2006.01)
    *B01J 20/34*     (2006.01)

(52) U.S. Cl.
CPC ......... *B01J 20/3035* (2013.01); *B01J 20/3078* (2013.01); *B01J 20/3204* (2013.01); *B01J 20/3236* (2013.01); *B01J 20/3433* (2013.01); *B01J 20/3483* (2013.01); *C01F 7/164* (2013.01); *C01F 11/04* (2013.01); *B01D 2251/404* (2013.01); *B01D 2253/104* (2013.01); *B01D 2257/504* (2013.01); *B01J 2220/4806* (2013.01); *B01J 2220/56* (2013.01); *C01P 2002/72* (2013.01); *C01P 2002/85* (2013.01); *C01P 2002/88* (2013.01); *C01P 2004/03* (2013.01); *C01P 2004/32* (2013.01); *C01P 2004/62* (2013.01); *Y02C 10/04* (2013.01); *Y02C 10/08* (2013.01); *Y02P 20/152* (2015.11)

(56) References Cited

OTHER PUBLICATIONS

Martavaltzi et al, "Development of New CaO Based Sorbent Materials for $CO_2$ Removal at High Temperature", Science DirectMay 2007, pp. 119-127.

* cited by examiner

US 9,550,147 B2

PARTICULATE, HETEROGENEOUS SOLID $CO_2$ ABSORBENT COMPOSITION, METHOD FOR ITS PREPARATION AND USE THEREOF

This application is a 371 of PCT/NO2010/000272 filed on Jul. 6, 2010, which claims priority to Norwegian Patent Application No. 20092579, filed Jul. 7, 2009, all of which are incorporated herein by reference.

FIELD OF INVENTION

According to a first aspect this invention relates to a particulate, heterogeneous $CO_2$-sorbent composition. According to another aspect the invention relates to a method for preparing a material composition according to the first aspect of the invention. According to another aspect the invention concerns a method for separating $CO_2$ from process gases by use of a $CO_2$-sorbent composition according to the first aspect of the invention.

BACKGROUND

The major problem of global warming demands that future energy technology must comply with both the requirement for increased energy and cost efficiency as well as the need for significant reductions in the $CO_2$ emissions. A crucial element of $CO_2$ handling in recently developed processes as well as in future processes not yet developed is the $CO_2$ capture, i.e. the way of industrially separating $CO_2$ from a mixture of various gases.

High temperature processes such as the combustion of fossil fuels (i.e. coal and petroleum), or the reforming natural gas emit significant amount of $CO_2$. Pre-combustion capture technologies such as absorption enhanced reforming (AER) of natural gas have been developed in the past few years and present interesting advantages such as: (1) production of carbon-free hydrogen, (2) cost efficiency and (3) $CO_2$ separation.

Post-combustion $CO_2$-capture at elevated temperature using Ca-based natural materials such as dolomite or limestone is also an important matter of research [1]. In that case $CO_2$ is separated from the other flue gases after the combustion of the fuel gas. Strong efforts are thus put into the development of efficient post-combustion $CO_2$-separation systems.

PRIOR ART

The carbonation of a sorbent and the subsequent regeneration at higher temperature is the method conventionally used in high temperature $CO_2$ capture processes. Ideally, the sorbent must present a large $CO_2$ absorption capacity, fast kinetics at low partial pressure of $CO_2$, a low temperature of regeneration and a high chemical and mechanical stability. The most conventionally used sorbents are natural Ca-based materials such as Limestone and dolomites. They have a high initial absorption capacity, good absorption and regeneration kinetics and are available in large quantities at low price. However, natural sorbents show a rapid decay of the absorption capacity with carbonation/calcination cycles [2]. This loss of $CO_2$ capacity is due to a grain sintering mechanism [3] at elevated temperature and loss of porosity due to small pores reduction [4]. A residual conversion of approx. 8 g $CO_2$/100 g sorbent for limestone was observed after 500 cycles [4, 5].

During the carbonation of CaO, a very fast reaction regime takes place initially [6] followed by a slow period. This decrease of reaction rate is due to the formation of a product layer of $CaCO_3$ decreasing the diffusion rate of the reacting species. Baker et al. [7] have determined a critical carbonate layer thickness of 22 nm before the reaction rate becomes diffusion controlled. Interpreting Hg porosimetry data of natural limestone, Alvarez et al. [8] have determined a critical product layer of 50 nm for CaO sorbent. Therefore, the synthesis of CaO-based sorbents with small particle size and high specific surface have been investigated in the past years [9-11] in order to overcome the degradation of the absorption capacity during cycles.

The conversion of the very fine particles (~10 nm) is reversible and 93% conversion over 30 cycles with a carbonation time of 24 h under 100% $CO_2$ was reported [7]. Grasa et al. [5] has tested different precursors for CaO in realistic conditions (regeneration temperature of 850° C. and 30 vol % $CO_2$ in air and 950° C. in 1 atm $CO_2$) showing that synthetic CaO sorbents display a rapid degradation after few cycles similar to that of natural materials despite a higher residual absorption capacity of approximately 16 g $CO_2$/100 g sorbent after 100 cycles.

The addition of an inert material as support for fine CaO sorbent has been recently proposed by several authors [12-13]. Feng et al. [14] studied the absorption capacity of fine CaO powder dispersed on porous particles of alumina. However, because of the small amount of supported CaO, the overall absorption capacity of the sorbent remains low (number). Li et al. [15] have developed a synthesis route for a new sorbent by integration of CaO (75 wt %) with a metal oxide (25 wt % $Ca_{12}Al_{14}O_{33}$). Introduction of the binder limits the sintering of the CaO particles. This synthetic sorbent showed a high $CO_2$ absorption capacity (45 g $CO_2$/100 g sorbent) and was stable during 50 cycles under mild conditions. A last report by Wu et al. [16] has proposed the utilization of nano particles $CaCO_3$ supported on $Al_2O_3$ as high temperature $CO_2$ sorbent. During carbonation/regeneration cycling, the CaO particles react with the $Al_2O_3$ to form the $Ca_{12}Al_{14}O_{33}$ giving a sorbent with a more stable durability. A very similar work was carried out by Martavaltzi et al. [17, 18] on CaO/$Ca_{12}Al_{14}O_{33}$ where the mixed oxide is synthesized by reaction of fine CaO or $Al_2O_3$ or Aluminium nitrates in the opposite of the invention reported here where the final composition is obtained by decomposition of $Ca_3Al_2O_6$.

OBJECTIVE OF THE INVENTION

The main objective of the invention is to provide a $CO_2$ absorbing material that has large $CO_2$ absorption capacity, good chemical stability during carbonation/regeneration cycling, and shows rapid absorption from start to end of each absorption cycle and as high mechanical fracture strength and attrition. The method for its preparation should be simple and comparatively inexpensive. Preferably the sorbent material according to the invention should be versatile in use, i.e. it should in addition be allowed to be combined with e.g. catalytic materials used for reforming applications and the like.

SUMMARY OF THE INVENTION

The objectives above are fulfilled by the $CO_2$ absorbing material according to the present invention. According to a second aspect, the invention also relates to a method for preparing the $CO_2$ absorbing material. According to a third and a fourth aspect, the invention relates to methods of separating $CO_2$ from process gases.

Preferred embodiments of the invention are disclosed by the dependent claims.

The particulate, heterogeneous solid $CO_2$ absorbent composition according to the present invention is based on $Ca_3Al_2O_6$, which is a well known material. According to the present invention a much more stable absorbent material is provided by means of the inventive method which causes a partial decomposition of the $Ca_3Al_2O_6$ as illustrated by the exemplification provided below.

It is reason to believe that the higher concentration of calcium at the particle surfaces is due to the presence of small CaO particles at the surface of larger particles of $Ca_{12}Al_{14}O_{33}$ which both are decomposition products of $Ca_3Al_2O_6$. The fact that CaO and $Ca_{12}Al_{14}O_{33}$ are both decomposition products of $Ca_3Al_2O_6$ in presence of steam and $CO_2$ at elevated temperature, has not been documented yet. The improved physical/chemical properties and their application as $CO_2$ capture component after decomposition of $Ca_3Al_2O_6$ has not been documented before and could not be foreseen.

The method of preparing the $CO_2$ absorbing material according to the first aspect of the present invention is conducted may be described as a two step procedure in which the first step is to provide a source of $Ca_3Al_2O_6$ (also denoted as the raw material). The raw material is heated to a temperature between 500 and 925° C. in the presence of steam and carbon dioxide causing the raw material to decompose in the final product.

PREFERRED EMBODIMENTS OF THE INVENTION

FIGS. 1 and 2 show a summary of the invention and the different preferred embodiments to obtain the desired composition for the $CO_2$ sorbent depending on the application of the invention. FIG. 1 summarizes the synthesis methods for the Ca-based $CO_2$ sorbent from rocks (route A) and from nitrate precursors (route B). Two possible methods are illustrated: the so-called "direct" method where the synthesized powder can directly be used as sorbent for high-temperature $CO_2$ capture and the preferred "pelletized" route that gives larger agglomerates of $CO_2$ sorbent with a greater size distribution and better mechanical properties. FIG. 2 shows the different alternatives for introducing the catalytically active material at different stages of the synthesis of the sorbent. A more detailed introduction to the different steps of the synthesis is described further in the preferred embodiments of the invention.

According to one preferred embodiment the step of providing a raw material comprising $Ca_3Al_2O_6$, comprises proving a source of calcium and aluminium ions mixed in solution and to dry the solution by heating it to a temperature in the range 100-400° C. for a period of 8-15 hours in the presence of a chelating agent and optionally a polymerizing agent to form a solid precursor and to heat the precursor to a temperature in the range 500 to 750° C. to burn any organic compounds present in the precursor and finally to heat the resulting powder to a temperature in the range 900-1100° C. for a period of 15 to 30 hours to form an oxide powder comprising $Ca_3Al_2O_6$.

According to a preferred embodiment of said method the source of calcium and aluminium is at least partially in the form of a nitrate solution.

Since mechanical stability is generally advantageous, the raw material comprising $Ca_3Al_2O_6$ is in some embodiments preferably compacted and pelletized in order to obtain a particulate, heterogeneous product having a desired particle size and shape, mechanical stability, crushing strength or resistance to attrition.

Abundant occurrence of the raw material in nature is advantageous as it contributes to the inexpensiveness of the overall process. To this end the aluminium and calcium for the source of their respective ions are therefore preferably collected and extracted from naturally occurring rocks such as anorthosite ($CaAl_2Si_2O_8$), calcite ($CaCO_3$) and combinations thereof.

As mentioned, for some applications it is preferred to combine the particulate, heterogeneous absorbing material according to the present invention with a metal source acting as catalyst at the surface of the particulate, heterogeneous absorbing material. The metal source may be any source of Ni, Co, Fe, Cr, Cu, Zn, Pt, Pd, Rh, Ru, and Ir.

The metal constituting the catalyst is preferably added subsequent the formation of the particulate, heterogeneous, solid, $CO_2$ absorbent composition by means of an impregnation technique of the particles but may also be added before decomposition of the $Ca_3Al_2O_6$ by introduction of a metal nitrate in the synthesis as illustrated in FIG. 2.

One method of separating $CO_2$ from a process gas, using the material according to the first aspect of the present invention, is conducted in one reactor the conditions of which is cycled between two ranges of temperature in order to a) absorb $CO_2$ in the first and lower range of temperature and to expel $CO_2$ from the sorbent in the second and higher temperature range. The reactor may be a fluidized bed reactor. This process is a batch process.

According to an alternative method separating $CO_2$ from a process gas is conducted in two reactors arranged in series in which the first reactor is maintained within a defined temperature interval in which the absorption takes place and the second reactor is maintained at a temperature range higher than the temperature range of the first reactor, the particulate material being circulated in a closed loop between the two reactors in order to periodically absorb $CO_2$ and periodically have $CO_2$ expelled therefrom. The arrangement of two reactors, which may be fluidized bed reactors, allows continuous feed of the first reactor by a carbon containing gas and a subsequent release of a $CO_2$ rich gases).

The gases to be reacted in a way liberating $CO_2$ include carbon rich gases such as gasified coal, methane, natural gas, other hydrocarbon containing gases and any combination of two or more of such gases.

Not restricted by the type of reactor arrangement used, the particulate heterogeneous product may be provided with catalytically active metal particles on the particle surface. The reactor conditions may be optimized with respect to hydrogen formation using a sorption enhanced steam methane reforming process. In this process, the $CO_2$ formed during the first step is absorbed by the particulate heterogeneous product and subsequently separated from the hydrogen to be recovered in a second step producing a $CO_2$-rich gas stream.

Catalytic material can be integrated in the synthesis e.g. for high temperature reforming of natural gasses.

The $CO_2$ absorbing material according to the present invention may be provided in different physical forms. Processing of the synthesized powder into particles or pellets provides material with substantial mechanical properties and desired particle size for industrial $CO_2$ absorption processes, and is therefore preferred for various applications.

DETAILED AND EXPERIMENTAL DESCRIPTION OF THE INVENTION WITH REFERENCE TO THE DRAWINGS

The invention will be described in more detail under reference to preferred embodiments and verification tests performed on the preferred embodiment as compared to a conventionally used $CO_2$ sorbent (dolomite). Throughout this discussion reference will be made to the enclosed drawings, where FIG. 1 shows the two synthesis routes according to the invention for the synthetic Ca-based $CO_2$ absorbents: from rocks (Route A) or from calcium or aluminium nitrate precursors (Route B). The figures also shows the two different possibilities to produce powdered or pelletized sorbent as well as the final thermal treatment as described in the invention FIG. 2 shows the three different alternatives for accommodation of the catalytically active material in the sorbent at various stage of the synthesis of the invention.

Figure 10:
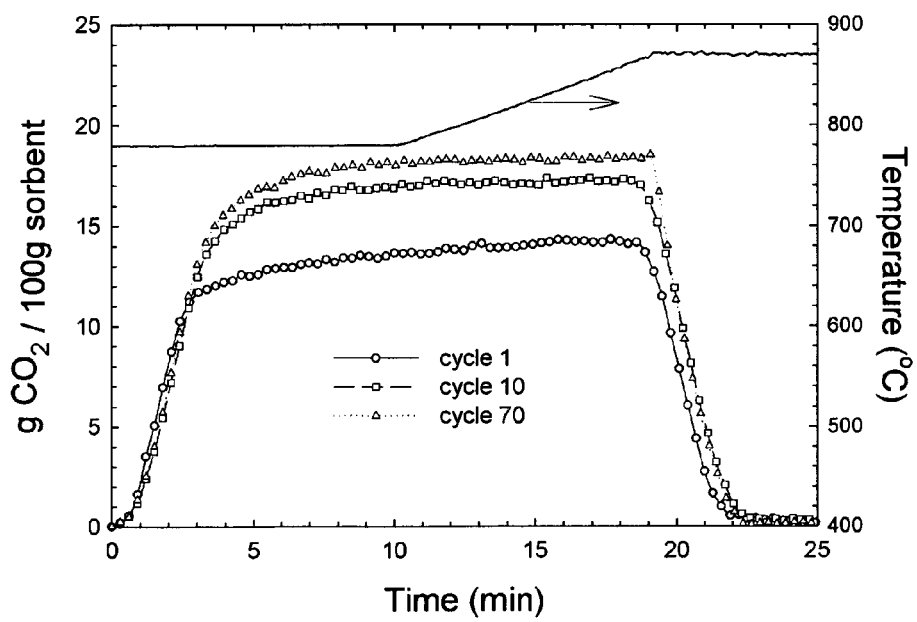

FIG. 10 shows a carbonation/regeneration cycles for $Ca_3Al_2O_6$ after decomposition produced according to the invention. Powder was carbonated at 780° C. in 50% $CO_2$/50% $H_2O$ atmosphere for 10 min and regenerated at 870° C. in 50% $CO_2$ and 50% $H_2O$ for 15 min.

Figure 11:
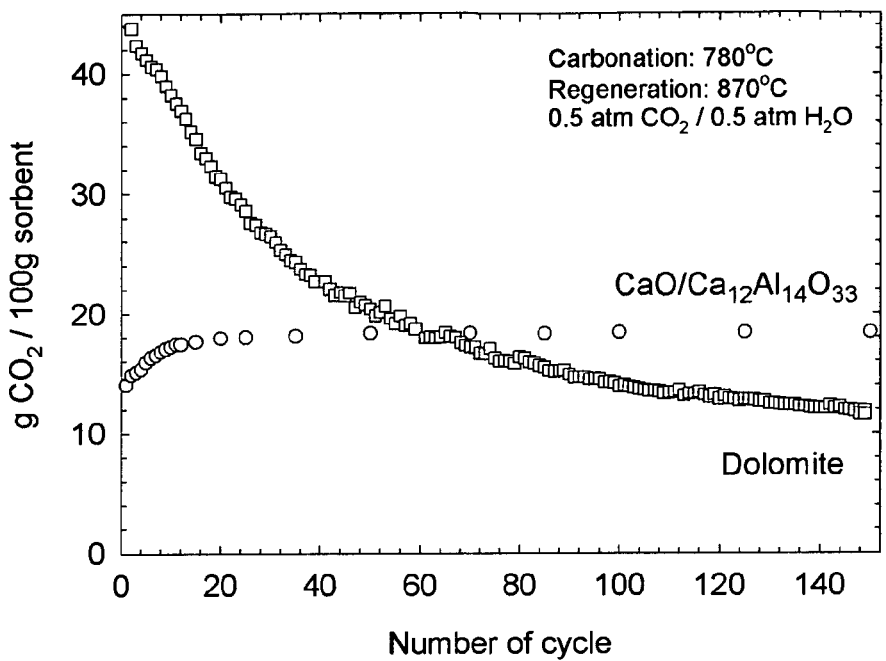

FIG. 11 shows the evolution of the absorption capacity of the $Ca_3Al_2O_6$ after decomposition produced according to the invention as a function of the number of cycles. Evolution of dolomite in similar conditions is included as a comparison.

Figure 12:
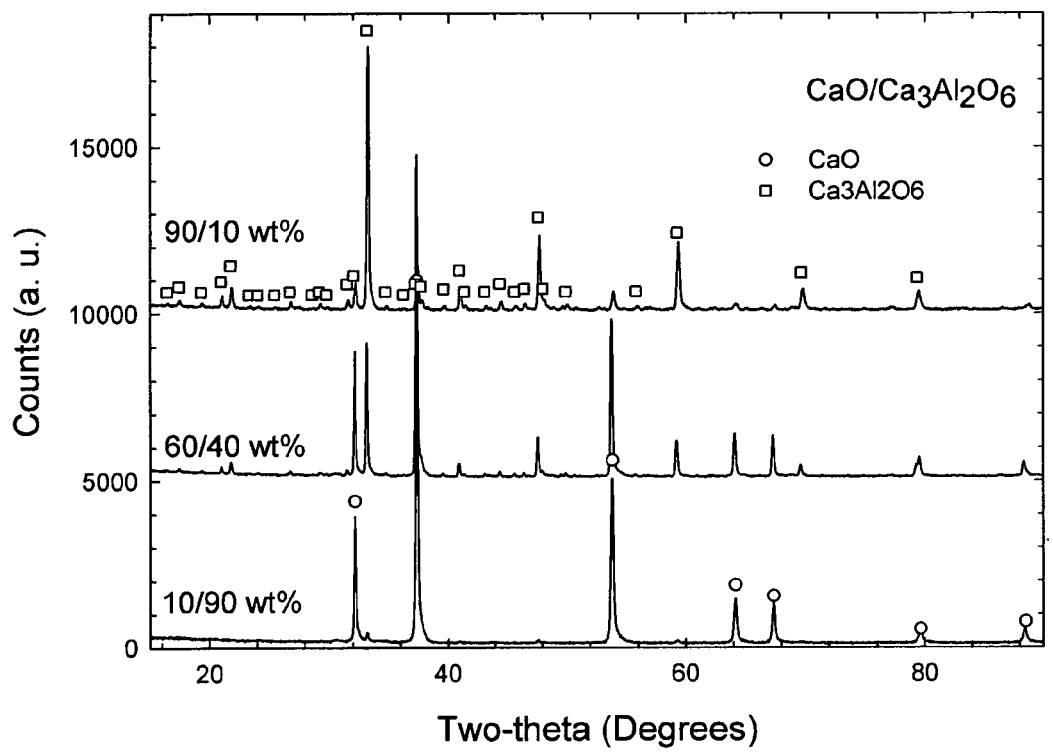

FIG. 12 shows X-ray Diffraction patterns of produced CaO—$Ca_3Al_2O_6$ powder according to the invention after calcination at 1000° C. for 12 h for different CaO-to-$Ca_3Al_2O_6$ weight ratios.

Figure 13:
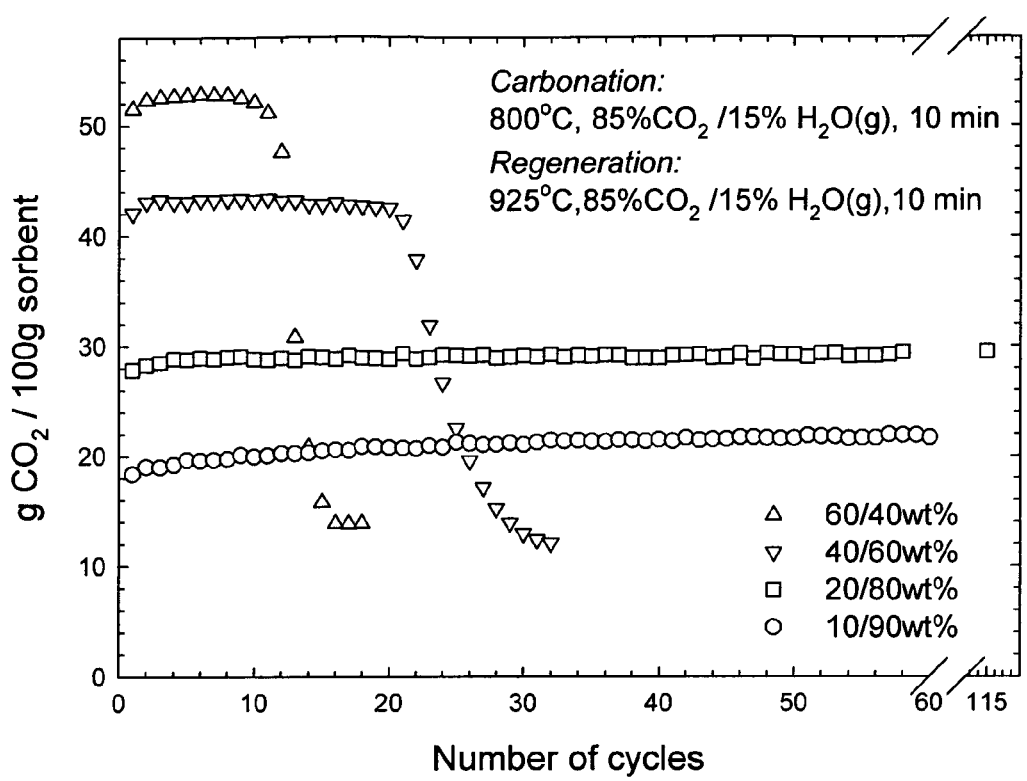

FIG. 13 shows the evolution of the absorption capacity of the CaO—$Ca_3Al_2O_6$ powder produced according to the invention for different CaO-to-$Ca_3Al_2O_6$ weight ratios.

Figure 14:
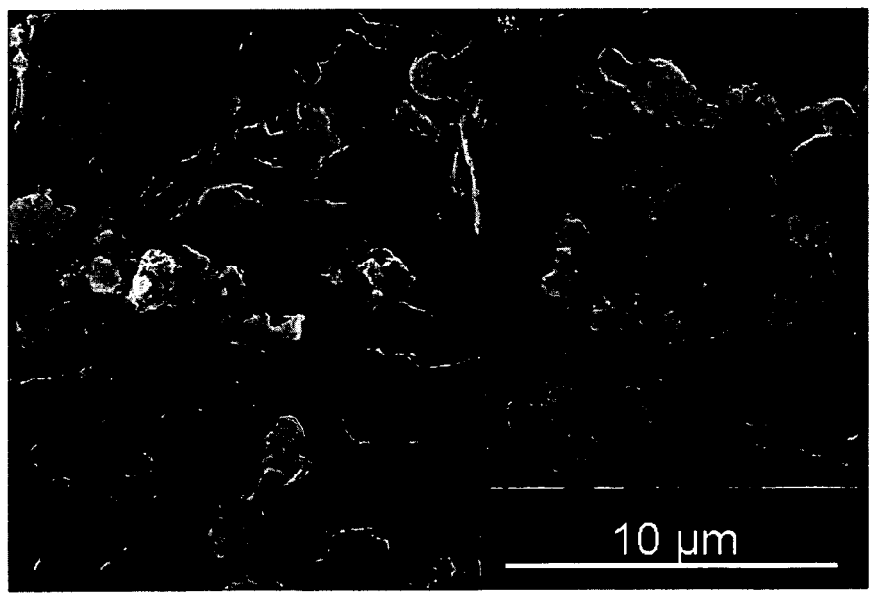

FIG. 14 shows SEM image of a pellet of sorbent particle after exposure to 50% $CO_2$ and steam.

Figure 15:
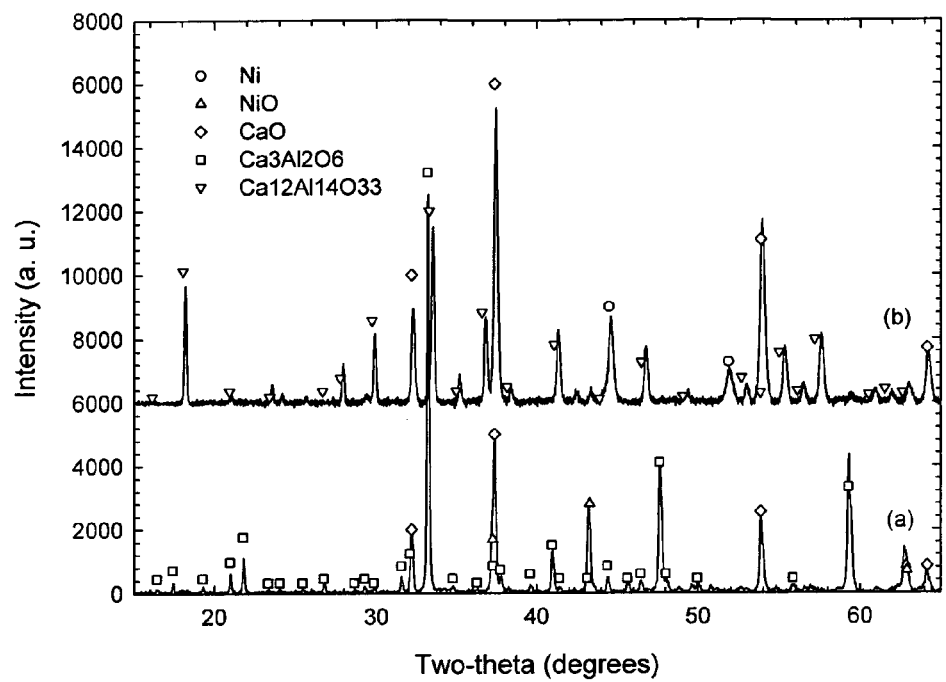

FIG. 15 shows X-ray Diffraction patterns of produced CaO—$Ca_3Al_2O_6$—NiO powder according to the invention a) after calcination at 1000° C. for 12 h and b) after heat treatment at 800° C. in 50% $CO_2$/50% $H_2O$ atmosphere for 24 hours.

Figure 16:
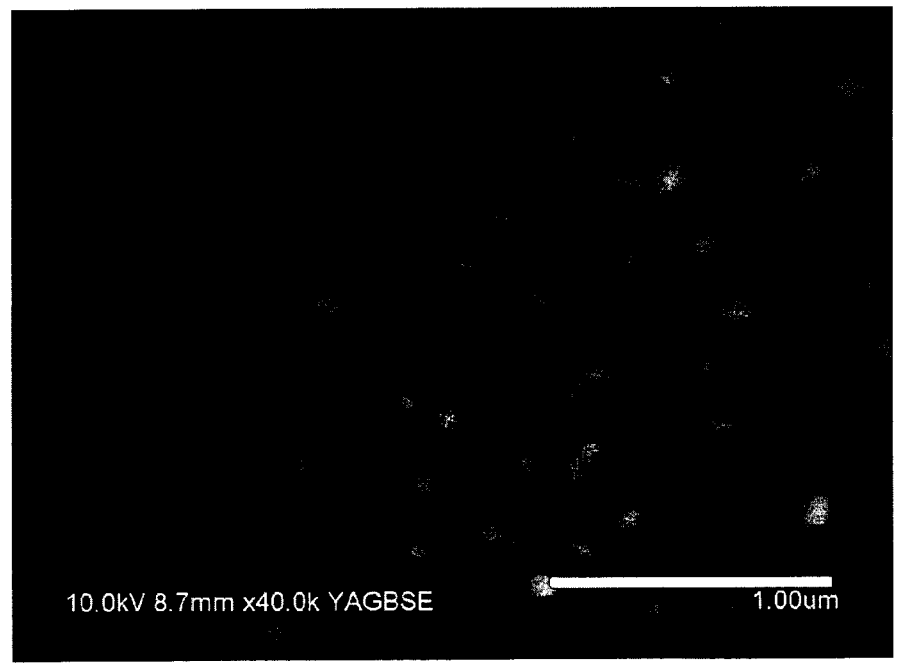

FIG. 16 shows a SEM image (back scattered electrons) of a pellet of sorbent particle with NiO after decomposition in 50% $CO_2$ and steam and multi cycle in severe conditions.

Figure 17:
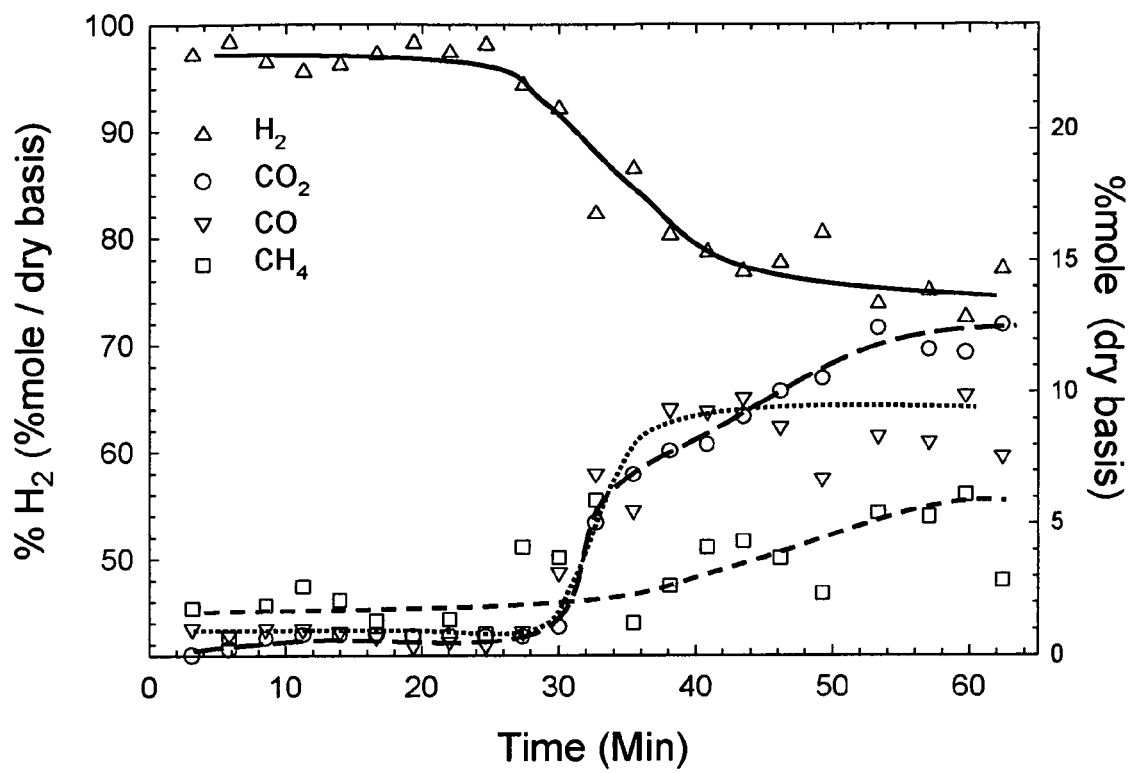

FIG. 17 shows the gas composition from the outlet of a fixed bed reactor (dry gas) as a function of time during reforming with methane (Steam/Carbon=3, 650° C., 500 ml/min). Reactor is filled with impregnated $CO_2$-sorbent according to the invention. Prior the reforming experiment, catalytically active material was reduced in $H_2$ at 650° C.

Several batches of $Ca_3Al_2O_6$ mixed CaO—$Ca_3Al_2O_6$ and finally mixed NiO—CaO—$Ca_3Al_2O_6$ were produced according to the inventive method and one sample of natural dolomite conventionally used as $CO_2$ sorbent were prepared in order to verify the effect of the mixed oxide compound produced according to the invention in a series of comparison tests.

The starting oxide powders were synthesized through the citrate route. Citric acid (CA) (Merck, >99.5%), ethylene glycol (EG) (Merck, >99.5%), aluminium nitrate nonahydrate ($Al(NO_3)_3 \cdot 9H_2O$, Aldrich >99%) and calcium nitrate tetrahydrate ($Ca(NO_3)_2 \cdot 4H_2O$, Aldrich >99%) were used as precursors. In addition, nickel nitrate $Ni(NO_3)_2 \cdot 6H_2O$ can be added to the aqueous solution in order to obtain 10 wt % NiO after calcination if needed for the application of the obtained material. Stoichiometric amounts of metal nitrates were dissolved in approximately 100 mL of deionized water in order to obtain the final powder. Citric acid monohydrate (CA) ($C_6H_8O_7 \cdot H_2O$, Merck GR for analysis >99.5%) was added in the molar ratio 2/1 to that of cations to make sure all the cations were complexed in the solution and ethylene glycol (EG) ($C_2H_6O_2$ pro analysis Merck >99.5%) was further added at a molar ratio EG/CA=3/2.

After achieving complete dissolution, the solution was introduced in an oven preheated at 160° C. for 6 h to evaporate the superfluous water. Upon heating the volume of the solution decreased and the viscosity of the solution increased gradually due to the esterification reaction between CA and EG. No evidence of precipitation was observed during the evaporation process. After evaporation of the water, a brown fluffy gel was obtained which was further pulverized and calcined at 600° C. for 6 h to burn off most of the organic residues. Finally, the powder was calcined at elevated temperature to obtained single phase materials. Prior further analysis, the powder was sieved under 150 μm.

Comparison Sample

Sample from Arctic Dolomite were mechanically crushed and sieved in the range 150-300 μm for TGA and fixed bed investigations. Before further analysis the samples where calcined in static air at 900° C. for 6 h to decompose the carbonates and remove the organic contents of the minerals.

Techniques of Characterization

The XRD spectra of the sorbents were performed on an Inel XRG 3000 diffractometer with CuKα radiation. XRD test results were retrieved and stored using commercial software (Inel Acquisition). The morphology of the powders and element analysis were performed by scanning electron microscopy (SEM, Hitachi S-4800 Field Emission)

Thermal stability, $CO_2$ sorption capacity and sorption/regeneration kinetics were studied using a thermo gravimetric analyzer (TGA, CI electronics). The TGA test was initiated in a $N_2$ atmosphere with temperature increased to the desired reaction temperature at a rate of 10° C./min. $N_2$, $CO_2$ and/or $H_2O$ were introduced after 5 minutes at the desired temperature. The $N_2/CO_2$ ratio was controlled by mass flow controllers (Bronkhorst, EL-FLOW Digital series). The steam flow was controlled using a liquid flow controller (Bronkhorst, Liquid-flow). The separate flows were combined using a controlled evaporation mixing system (Bronkhorst, CEM). The effects of $CO_2$ and steam partial pressures on the carbonation of the Ca-based sorbent were also investigated. Natural Ca-based sorbents like artic dolomite were investigated as a comparison. Similar flow meters and conditions were used to investigate the reforming of methane in the fixed bed reactor. Approx 30 g of the synthesized powder was loaded and mechanically compacted in the reactor prior investigated. Gas composition at the outlet of the reactor was analyzed using a micro GC (Agilent 3000A).

Results and Discussion

1—Decomposition of the $Ca_3Al_2O_6$

Figure 3:
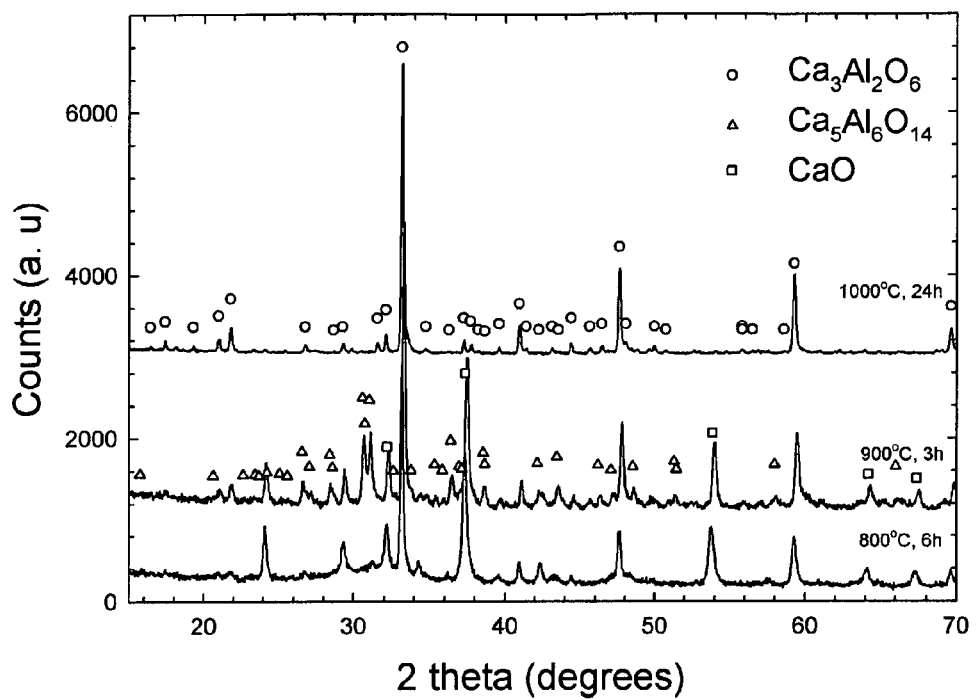
FIG. 3 shows X-ray Diffraction patterns of $Ca_3Al_2O_6$ synthesized according to the invention after calcination at various temperatures.

X-ray Diffraction (XRD) patterns of the $Ca_3Al_2O_6$ powder after calcination at various temperatures are shown in FIG. 3. After calcination at 900° C. for 6 h, CaO did not completely react with the aluminate and traces of $Ca_5Al_6O_{14}$ were detected in the powder together with CaO and $Ca_3Al_2O_6$. The amount of secondary phase decreases with increasing calcination temperature and time and single phase $Ca_3Al_2O_6$ materials were finally obtained after calcination at 1000° C. for 24 h and 1100° C. for 1 hour. An optimal calcination conditions for the invention was determined to be 12 hours at 1000° C.

Figure 4:
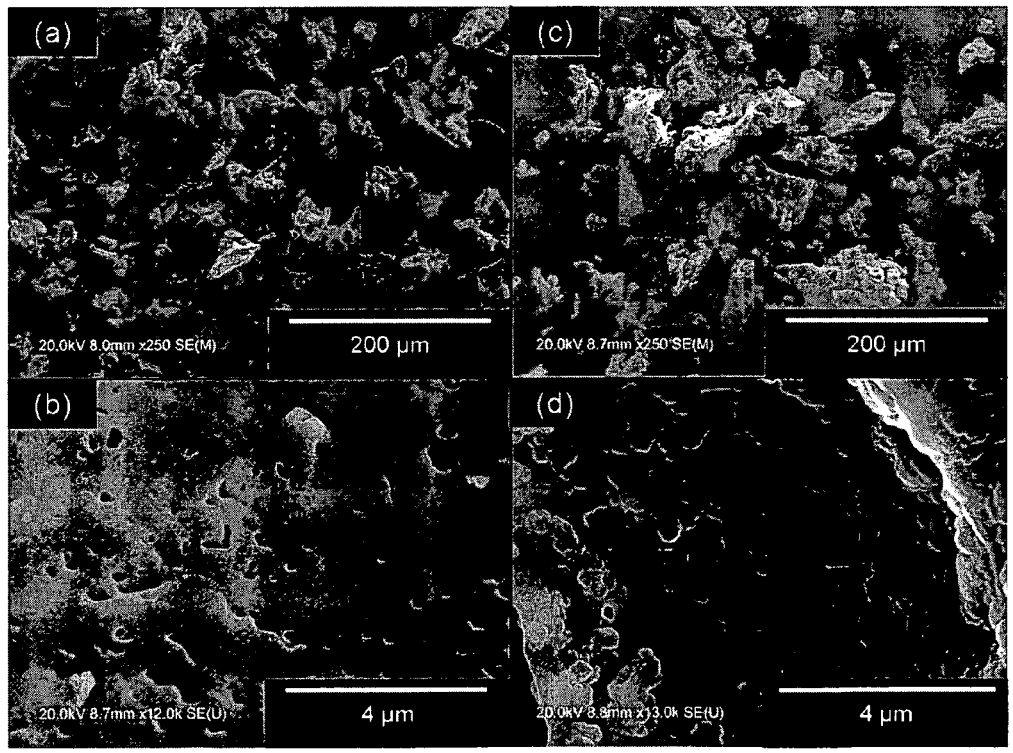
FIG. 4 shows SEM images of produced $Ca_3Al_2O_6$ powder according to the invention a) and b): after calcination at 1000° C. for 12 h, c and d): after heat treatment at 800° C. in 50% $CO_2$/50% $H_2O$ atmosphere for 24 hours.

The SEM image as the obtained pure $Ca_3Al_2O_6$ particles is shown in FIGS. 4 a) and b). The typical particle size is 10 to 100 um. The surface of the synthesized $Ca_3Al_2O_6$ particle is homogeneous and present low apparent porosity.

Figure 5:
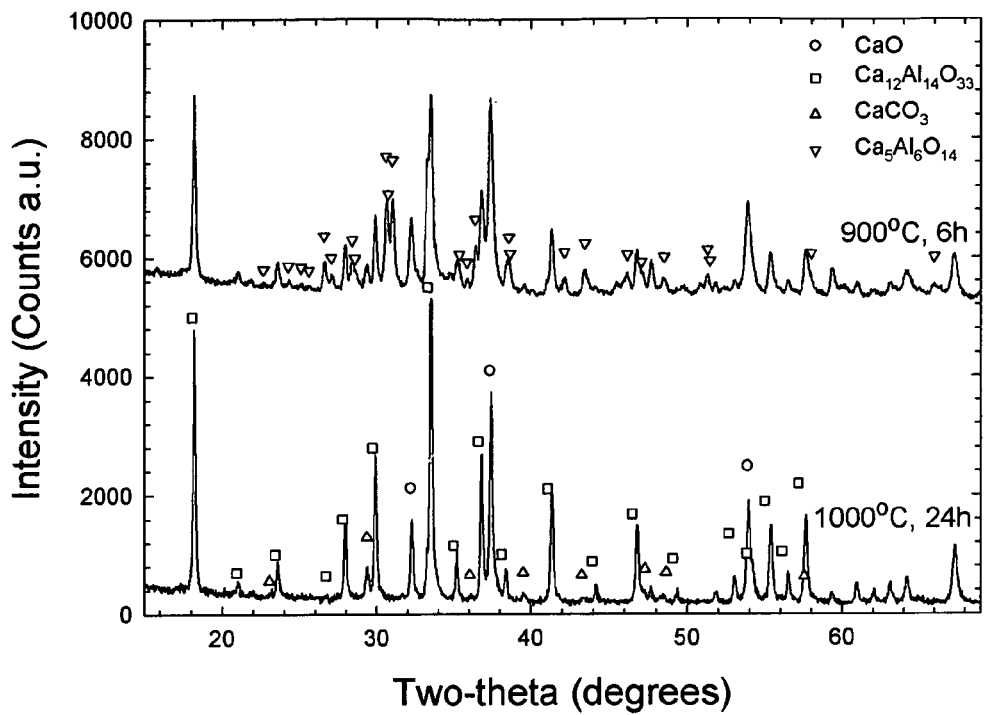
FIG. 5 shows X-ray Diffraction patterns of $Ca_3Al_2O_6$ calcined at various temperatures according to the invention after heat treatment at 800° C. in 50% $CO_2$/50% $H_2O$ atmosphere for 24 hours.
Figure 6:
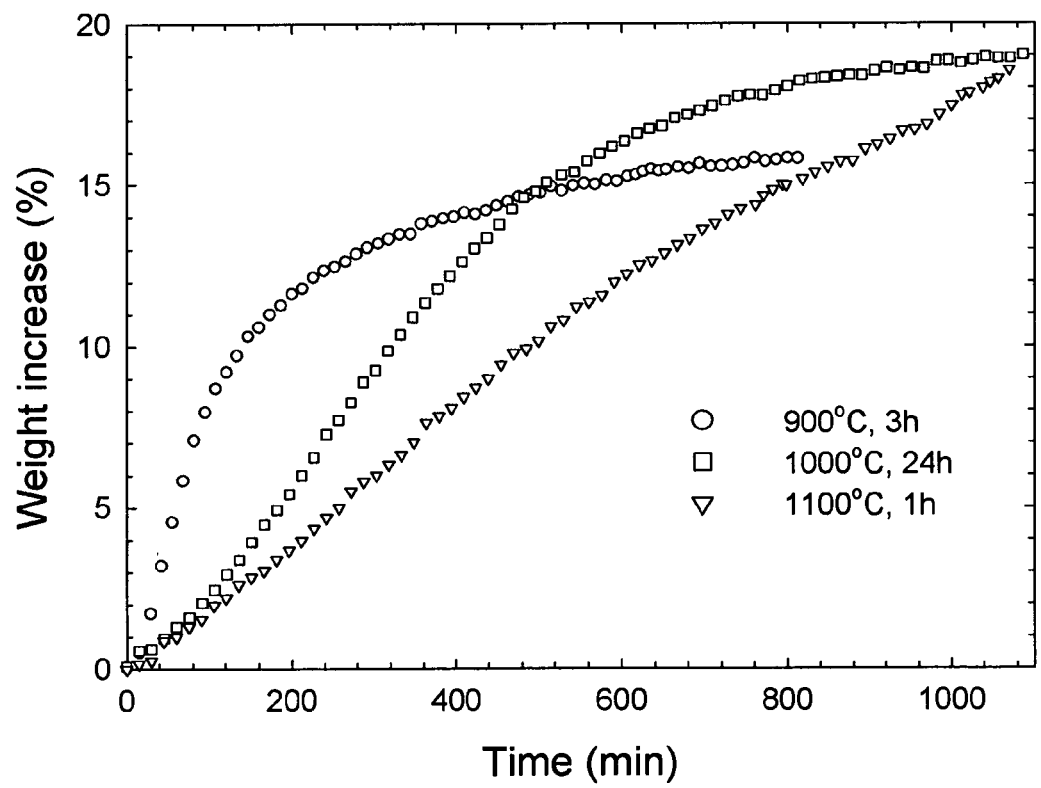
FIG. 6 shows the thermo gravimetric analysis of $Ca_3Al_2O_6$ powder according to the invention during heat treatment at 800° C. in 50% $CO_2$/50% $H_2O$ atmosphere for 24 hours.
Figure 7:
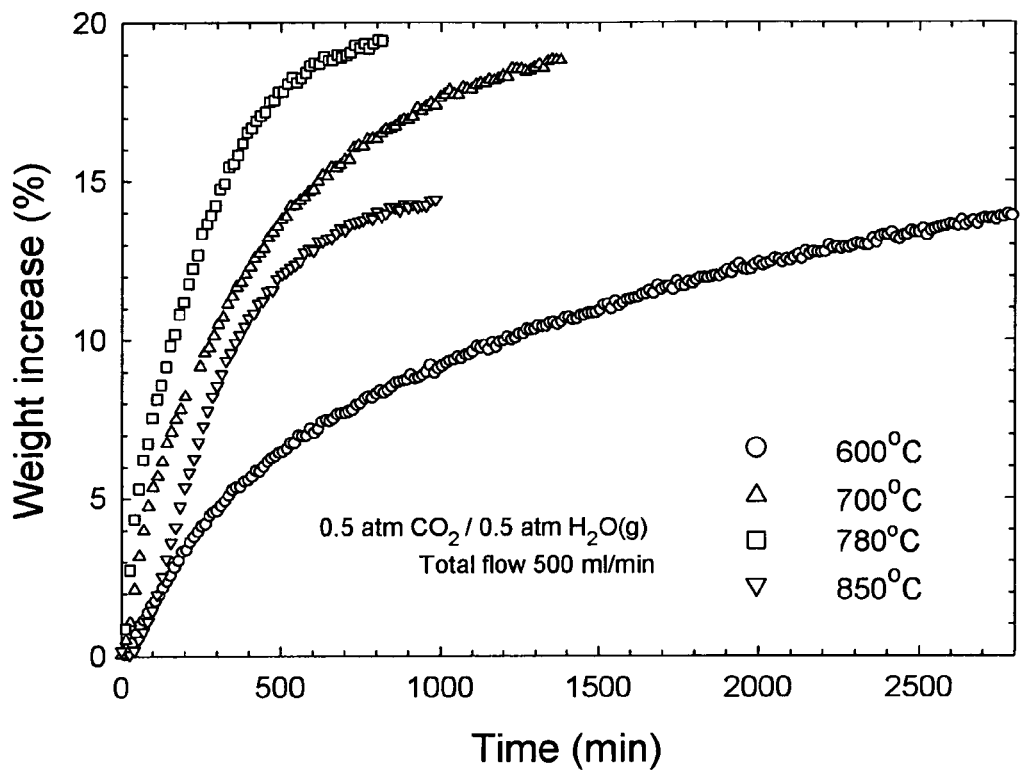
FIG. 7 shows the effect of temperature of decomposition of $Ca_3Al_2O_6$ powder synthesis according to the invention, calcined at 1000° C. for 24 h in controlled atmosphere: 0.5 atm $CO_2$ and 0.5 atm $H_2O$ (g).
Figure 8:
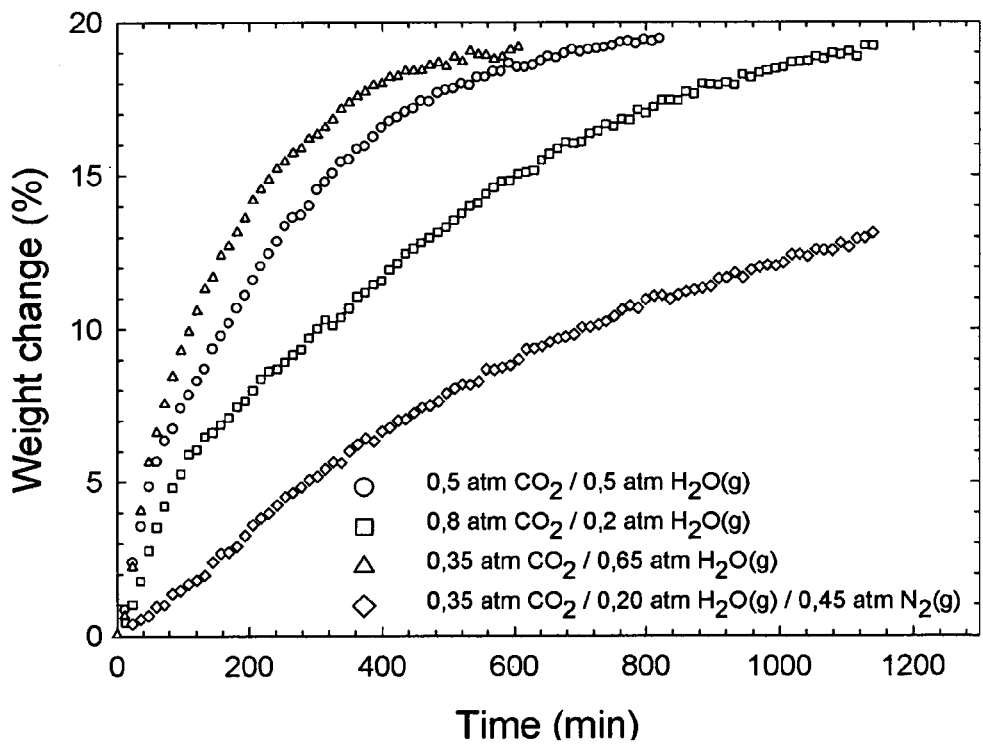
FIG. 8 shows the effect of partial pressure of $CO_2$ and $H_2O$ (g) at 780° C. on decomposition of $Ca_3Al_2O_6$ powder calcined at 1000° C. for 24 h according to the invention.

In order to study the chemical stability of $Ca_3Al_2O_6$, the powder was exposed to different partial pressure of $CO_2$ and steam at elevated temperature. After switching atmosphere from $N_2$ to a $CO_2$/steam mixture at elevated temperature, a weight increase was observed as illustrated in FIGS. 6, 7 and 8. As evidenced by the XRD pattern (FIG. 5), after exposure to 50% $CO_2$/steam atmosphere at 800° C. for 24 h, $Ca_3Al_2O_6$ decomposes into CaO and $Ca_{12}Al_{14}O_{33}$ according to the reaction (1):

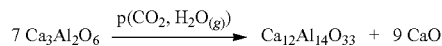

$$7\,Ca_3Al_2O_6 \xrightarrow{p(CO_2, H_2O_{(g)})} Ca_{12}Al_{14}O_{33} + 9\,CaO$$

The weight increase during decomposition is due to the carbonation of the formed CaO after decomposition of the initial $Ca_3Al_2O_6$ powder. According to (1) a maximum weight increase of 20,974 g of $CO_2$ per 100 g $Ca_3Al_2O_6$ is expected. The measured value of weight increase (FIG. 6) is in accordance with the calculated value. Therefore, a total conversion of more than 90% of the CaO formed during decomposition is evidenced. However powders calcined at 900° C. for 6 h, the secondary phase initially present $Ca_5Al_6O_{14}$ is still present in the powder after exposure to a steam and $CO_2$ at elevated temperature 800° C.

The influences of the preparation temperature, absorption temperature and partial pressures of $CO_2$ and $H_2O$ (g) on kinetics of $CO_2$-uptake were thoroughly investigated by TGA.

2—Effect of the Calcination Temperature on $CO_2$-Uptake

Figure 1:
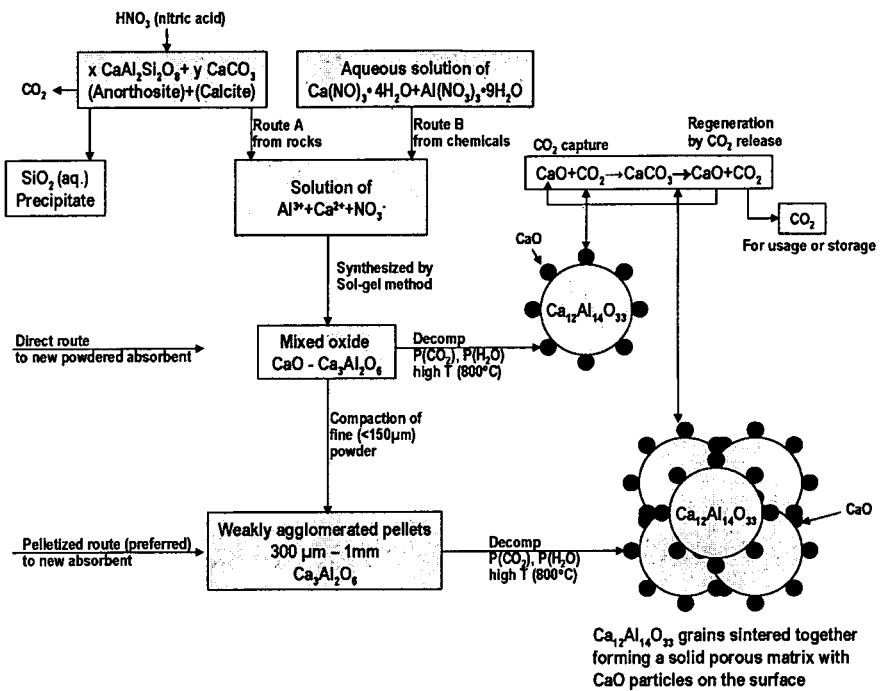
Figure 2:
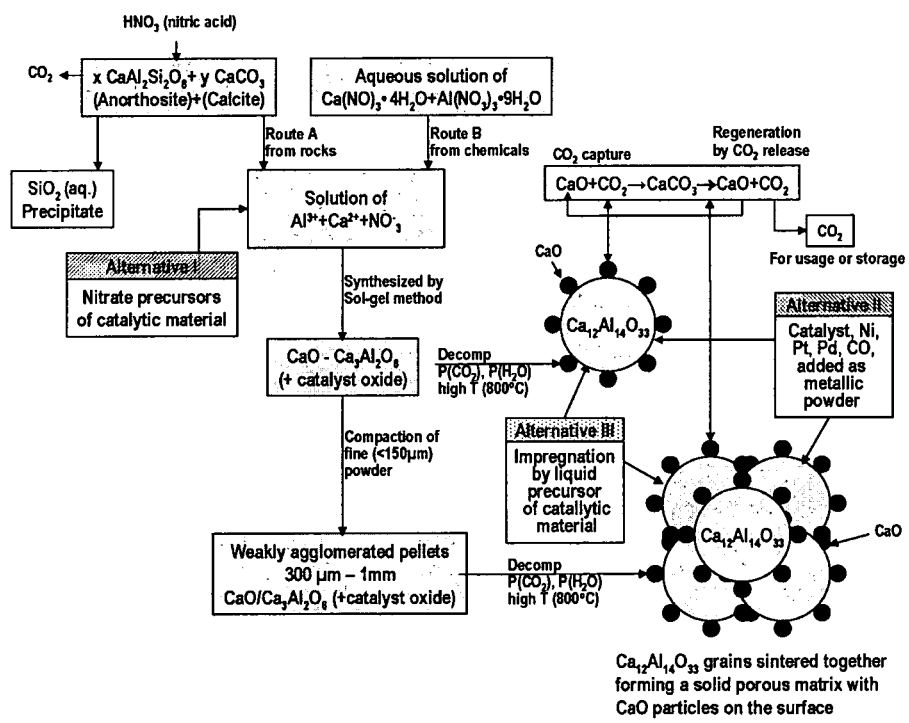

The influence of the calcination temperature on the stability of the powder is illustrated in FIG. 6. Materials synthesized at 900° C. for 6 h, 1000° C. for 24 h and 1100° C. for 1 h were successively exposed to low partial pressures of $CO_2$ and steam at 780° C. In those conditions, a weight increase was measured for the three different powders due to the carbonation of formed CaO during decomposition according to the invention. However, the kinetic of absorption of $CO_2$ seems to be dependent on the calcination temperature. Powder calcined at 900° C. displays the highest weight increase rate but has a lower maximum weight increase (~16 wt %) while powders calcined at higher temperature and for longer time show a slower weight increase but a higher maximum value close to 20 wt %. The lower weight increase for powder calcined at 900° C. is due to the stability of $Ca_5Al_6O_{14}$ during thermal treatment (FIG. 5). Thus, in order to obtain a maximum $CO_2$ absorption capacity after high-temperature treatment in $CO_2/H_2O$, the synthesized material should be single phase. However, increasing the calcination temperature and the calcination time during synthesis increases the stability of the formed particles and decreases the kinetic of decomposition of $Ca_3Al_2O_6$ (FIG. 2).

3—Effect of the Treatment Temperature on the Decomposition of $Ca_3Al_2O_6$

FIG. 7 shows the influence of the temperature on the decomposition rate of the $Ca_3Al_2O_6$. The experiments were performed in to 0.5 atm $CO_2$ and 0.5 atm $H_2O$. A maximum decomposition rate was measured for a decomposition temperature of 780° C. At 700° C. and 780° C., a maximum weight increase of ~19.5% was measured while at 600° C., the maximum was not reached because of the slow kinetic. At 850° C., the kinetic of decomposition is decreased as well as the maximum $CO_2$-uptake (~14.5%). Finally the powder was treated at 900° C. in the same atmosphere for 12 hours but no weight increase was observed on the TGA. After exposure at 900° C., the powder was cooled down to 700° C. in $N_2$ and exposed to 0.5 atm $CO_2$/0.5 atm $H_2O$. A swift weight increase of 4 wt % was then measured followed by a steady weight increase similar to the weight increase observed previously for powder decomposed at 700° C.

Both steam and $CO_2$ must be present in the feed gas mixture to observe the decomposition of $Ca_3Al_2O_6$. Formation of $CaCO_3$ at high temperature seems to be a possible driving force for the decomposition of $Ca_3Al_2O_6$ into $CaCO_3$ and $Ca_{12}Al_{14}O_{33}$. The equilibrium partial pressure of $CO_2$ as a function of calcination temperature calculated from an equation proposed by Baker et al [7]. According to this equation, at $P_{CO2}$=0.5 atm, the calcination temperature of $CaCO_3$ is 853° C. Therefore, when the material was exposed at a $CO_2/H_2O$ mixture at 850° C., the total decomposition of the material was not reached after 20 hours while at 900° C., no decomposition of the $Ca_3Al_2O_6$ was observed.

4—Effect of Partial Pressure of $CO_2$ and Steam

The influence of the partial pressure of $CO_2$ and steam on the decomposition rate of the $Ca_3Al_2O_6$ was investigated by exposing the materials to different partial pressures of $CO_2$ and steam at 780° C. (FIG. 8). When the material was exposed to 100% $CO_2$ or 100% steam, no weight variation could be observed meaning that $Ca_3Al_2O_6$ is stable. In diluted atmosphere (35% $CO_2$, 20% $H_2O$, 45% $N_2$) the maximum weight increase was 13% after 20 hours. Increasing the partial pressure of $H_2O$ (35% $CO_2$/65% $H_2O$) and the partial pressure of $CO_2$ (80% $CO_2$/20% $H_2O$) the decomposition rate of decomposition is increased and the maximum weight uptake of ~19.5% was achieved after respectively 9 and 19 hours.

Introduction of steam in the feed gas was shown to be necessary to decompose the $Ca_3Al_2O_6$. A higher reactivity was observed at high steam partial pressure. Previous reports have shown the influence of steam on the $CO_2$ capture but mechanisms are not fully understood. However, steam hydration of CaO increases both pore area and pore volume, consequently improving the long-term conversion to $CaCO_3$ over multiple cycles [19]. Thus, diffusivity of $CO_2$ through the product layer is improved and the reaction kinetics enhanced.

5—Morphology of the Sorbent

FIGS. 4 c) and d) shows the SEM image of the $Ca_3Al_2O_6$ after treatment at 800° C. in 50% $CO_2$ and 50% $H_2O$. The morphology of the particles seems not to be affected by the thermal treatment as shown by images (a) and (c). However, the surface of the particles changed after exposure to steam and $CO_2$ at elevated temperature and small (200-500 nm) spherical particles were formed.

Figure 9:
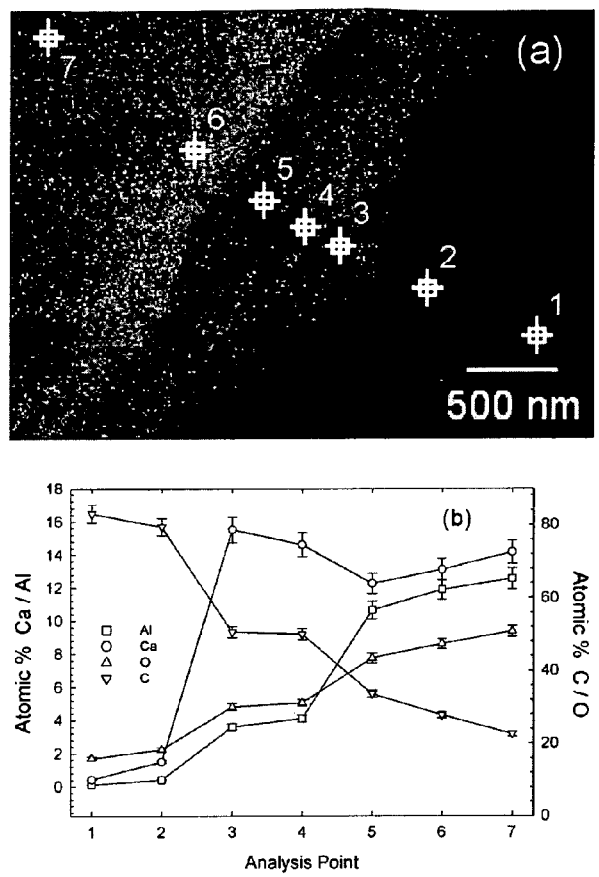
FIG. 9 shows SEM image of a cross section of a sorbent particle after exposure to $CO_2$ and Steam (a) and elemental composition obtained by EDS at various along the particle (b).

A cross section of the particles after treatment in $CO_2$/steam at 800° C. is shown in FIG. 9. A homogeneous outer layer of approximately 500 nm to 1 μm could be observed around the large particles. The elemental analysis was performed in different points on the particles as shown in FIG. 9(b). An increase of the concentration of Calcium at the surface of the particle is then evident while the concentrations inside the particle correspond to a composition close to $Ca_{12}Al_{14}O_{33}$.

Those results seem to indicate that those spherical nano particles are mainly constituted of a CaO phase that has formed on the surface of larger calcium aluminate particles. Those nano particles are homogeneous in size and are uniformly distributed on the surface of the aluminate particles forming a thin (500 nm-1 um) CaO-rich layer. The elementary analysis of the cross section of the agglomerates has shown an increased concentration of Ca at the surface of the agglomerates while the Ca-to-Al ratio in the bulk of the particles is close to the atomic ratio corresponding to the formula $Ca_{12}Al_{14}O_{33}$. The higher concentration of Ca compared to Al in the bulk might be caused by traces of $CaCO_3$ trapped in the bulk material after regeneration as evidenced by XRD (FIG. 3)

6—Stability During Multi-Cycles Analysis

Because of the available free CaO formed during decomposition of $Ca_3Al_2O_6$, this material has a potential as high temperature $CO_2$ acceptor. After decomposition of the $Ca_3Al_2O_6$ at 800° C. in 50% $CO_2$ and 50% steam the powder was regenerated in 50% $N_2$ and 50% $H_2O$. In order to determine its potential as high temperature $CO_2$-sorbent, the powder was repeatedly exposed to a mixture of 50% $CO_2$/50% steam at 780° C. for 10 min, heated to 870° C. for regeneration with a 10K/min heating ramp and finally cooled to 780° C. in 50% $N_2$/50% $H_2O$ (g) with a 3K/min cooling ramp. The weight variations during the first, $10^{th}$ and $70^{th}$ cycles are illustrated in FIG. 10 together with the temperature profile. The experiment shows a swift $CO_2$ uptake at 780° C. followed by a plateau followed by a release of $CO_2$ at 870° C. The absorption and regeneration kinetics remain unchanged during absorption/calcination multi-cycles. The maximum absorption capacity for each cycle is illustrated in FIG. 10. The $CO_2$ absorption capacity is increasing from 14 to 18 wt % during the first 20 cycles and is constant around 18.5% for more than 150 cycles afterwards. For comparison the absorption capacity of natural dolomite during multi cycles in the same conditions is illustrated in the same figure. Dolomite shows a large decay of its $CO_2$-uptake from 44 wt % during the first cycle to 16 wt % at $70^{th}$ cycles and finally stabilizes around 10 wt % above 150 cycles as reported previously by various authors [2, 3, 5, 19].

During long term multi-cycling, the material shows a slight increase of the absorption capacity during the 10 first cycles which might be attributed to a completion of the decomposition of the $Ca_3Al_2O_6$ starting material. After 10 cycles, the absorption and regeneration kinetics are stable whilst the total absorption capacity of the material remains close to 20 g $CO_2$/100 g sorbent for 150 carbonation/calcination cycles in severe regeneration conditions. This improved stability compared to conventional $CO_2$ sorbents might be attributed to a limited sintering of the CaO nano particles due to a low agglomeration of the nano particles on the surface and a limited mass transfer between the CaO particles even at elevated temperature. Because of the small size of the CaO particles, the sorbent shows a high reactivity and high a conversion level above 90% of the total $CO_2$ capacity after 150 cycles.

7—Study of CaO—$Ca_3Al_2O_6$ Mixed Oxide Powder

To increase the total $CO_2$ capacity of powder, mixed powder CaO—$Ca_3Al_2O_6$ were synthesized with different CaO-to-$Ca_3Al_2O_6$ weight ratio, x, (x=m(CaO)/m($Ca_3Al_2O_6$)) with x=0.6, 0.4 0.2 and 0.1. As shown in FIG. 11, single phase mixed oxide powder were obtained after calcination at 1000° C. for 12 h.

During thermal treatment at 800° C. for 24 h in a $CO_2$/steam gas mixture, a first swift weight increase due to the carbonation of the CaO introduced in the powder during synthesis was observed. A second weight increase with a slower rate was also observed which can be attributed to the carbonation of CaO formed during decomposition of the $Ca_3Al_2O_6$ as illustrated in (1).

To determine the optimal CaO content in the mixed powder, multi cycles experiments similar to those described previously were carried out on mixed powder after decomposition of the $Ca_3Al_2O_6$. The powders were studied in severe calcination conditions (carbonation at 800° C. and calcination at 925° C. in 85% $CO_2$ and 15% steam) to enhance the sintering process of CaO. The evolution of the absorption capacity for those powders during multi cycling is illustrated in FIG. 13.

Increasing the CaO content in the powder, the total absorption capacity is increased but the stability during multi cycles is also decreased. At high Ca-content (x=0.6 and 0.4, the powder shows a large decay of absorption after respectively 10 and 20 cycles. However for x=0.1 and x=0.2, no decrease of absorption capacity was observed even after 200 cycles in those severe conditions. The kinetics of absorption and calcinations remained unchanged during multi cycles indicating a stable reactivity of the CaO particles and a stable $CO_2$ capacity of respectively of approximately 21 and 29 g $CO_2$/100 g sorbent.

8—Formation of Pellet by Compaction of the Powder

Before heat treatment powders were compacted using a uniaxial press in order to form pellets of the synthesized. Pressure between 20 and 250 MPa were applied to compact the sorbent powders causing the green apparent density of the ceramic pellets to increase from 35% to a maximum of 50%. The formed pellets were further exposed to $CO_2$ and Steam for heat treatment at 800° C. and cycled as described previously.

FIG. 14 shows a SEM image of the 20 wt % CaO—$Ca_3Al_2O_6$ powder after heat treatment and 200 carbonation/regeneration cycles. A partial sintering of the $Ca_{12}Al_{14}O_{33}$ can be observed. Necks between the particles were formed, creating a large porous matrix where smaller CaO particles were formed after decomposition. The partly-sintered matrix of $Ca_{12}Al_{14}O_{33}$ is believed to contribute to the good mechanical stability of the obtained pellet whilst the porous structure allows a good diffusion of the reactant gases to the CaO nano particles homogeneously distributed in the pores. No further sintering of the pellets were observed during multi-cycling.

The particle strength was measured using a uniaxial strength gauge. A maximum strength of 29.41 N (+/−4.5) was measured for sorbent particles with a size distribution between 0.5 and 1 mm, compacted with a 250 MPa and heat treated 12 hours at 800° C. in steam and $CO_2$. As a comparison, natural dolomite with the same particle size has a crushing strength of 11.2 (+/−2.8) before calcination, 5.8 N (+/−2.5) after calcination at 900° C. for 6 h and 23.9 (+/−1.5N) after 200 carbonation/regeneration cycles (fully sintered particles).

9—Catalytic Material in the Synthesis of the Sorbent Material

In order to accommodate a catalytically active material in the sorbent particles, three different alternatives were found as illustrated in FIG. 2.

The first alternative is to introduce the catalytically active material among the sorbent precursors within the synthesis precursors. The final composition is obtained after calcination at high temperature according to the invention. The catalytically active material is homogeneously distributed in the powder. FIG. 15 shows the XRD pattern of the powder obtained after calcination at 1000° C. for 12 h when stoichiometric amount of nickel nitrate (to obtain 10 wt % NiO in the final powder) is introduced in the precursor solution. The three oxide phase CaO, $Ca_3Al_2O_6$ and NiO can be detected without secondary phases.

The obtained powder was further compacted in pellet and heat treated to decompose the $Ca_3Al_2O_6$. FIG. 16 shows the SEM image of the calcined powder observed with back scattered electron diffraction. FIG. 12 shows brighter spots homogeneously distributed on the surface and in the porous sorbent. Those can be attributed to NiO nano particles (5-15 nm) formed during the synthesis. Those particles were shown to be stable and no secondary reactions with $Ca_{12}Al_{14}O_{33}$ was observed after multi-cycling in the operative conditions.

Finally the material was reduced in 50% H2/50% steam at 500° C. for 4 h. FIG. 15, shows the XRD pattern of the material after reduction. The NiO particles were successfully reduced to metal particle without affecting the calcium-based sorbent particle.

A second alternative to incorporate the catalyst in the sorbent particle is to homogeneously mix the sorbent particle with a pre-reduced catalyst powder for reforming of hydrocarbon containing gas (FIG. 2).

Finally a third alternative to incorporate the catalyst in the sorbent is to impregnate the pellets formed after decomposition and partial sintering of the $Ca_{12}Al_{14}O_{33}$ with a liquid precursor of the catalytically active material. The agglomerates are impregnated under vacuum to obtain diffusion of the liquid within the pores of the agglomerates. The agglomerates are then dried at a temperature between 100 and 300 degrees to evaporate the liquid solvent and further heated at a temperature between 500 and 800° C. and finally, of necessary reduced under $H_2$ gas to activate the catalyst.

This method was used to impregnate the sorbent synthesized according to the invention. The liquid used was a Ni-nitrate. Powder was then calcined at 700° C. for 6 h and reduced in $H_2$ for 30 min at 650° C.

The impregnated powder was then arranged in a fixed bed reactor and exposed to a mixture of methane and steam in reforming conditions. FIG. 17 shows the gas composition at the outlet of the fixed bed reactor. A yield of $H_2$>95% was obtained during 25 min while $CO_2$, CO and $CH_4$ concentrations remain low. After 25 min, when the sorbent is fully converted into $CaCO_3$, $H_2$ concentration rapidly drops down to approximately 75 mole % while the concentrations of CO, $CO_2$ and $CH_4$ increase in the outlet gas mixture. Those concentrations correspond to normal reforming concentrations in such conditions. These results show that the catalyst incorporated in the particle is active and can efficiently reform methane and possibly other hydrocarbon containing gases. This also shows that the sorbent synthesized according to the invention efficiently capture $CO_2$ produced during the reforming and the water gas shift reaction in the reactor.

ADVANTAGES OF THE INVENTION

As shown above a new $CaO/Ca_{12}Al_{14}O_{33}$ type of high temperature $CO_2$ sorbent has been synthesized via decomposition of $Ca_3Al_2O_6$ during thermal treatment in a steam/$CO_2$ gas mixture. This new sorbent shows improved $CO_2$-acceptor property compared to conventionally used natural dolomite material. The new sorbent synthesized according to the invention shows a high reactivity and good $CO_2$ absorption capacity. A total conversion level of 90% during more than 150 carbonation/calcination cycles at 870° C. with 50% steam in $CO_2$ was evidenced for the sorbent obtained from decomposition of single phase $Ca_3Al_2O_6$ material.

Based on equation 1 the relative amount of CaO: $Ca_{12}Al_{14}O_{33}$ is 26.7:73.3 (by weight). It is experimentally found that an increase of CaO is beneficial within a certain range, but that amounts in excess of 45% by weight is detrimental to the absorption properties and therefore not desired. A relative amount of CaO in the range 25-45% is preferred, and more preferred an amount in the range 26.7-41% by weight (of the total $CaO+Ca_{12}Al_{14}O_{33}$ amount)

Thus, by increasing the CaO content in the starting composition, the total $CO_2$ absorption capacity is increased, however, the stability during multi-cycling is decreased. An optimal CaO content of 20 wt % CaO-80 wt % $Ca_3Al_2O_6$ was shown to be the most appropriate starting composition. The reason for the improved properties of the composite material is the formation of nano particles of CaO at the surface of larger calcium aluminate particles. Experimental studies evidenced limited grain growth and absence of sintering of the CaO particles even under severe calcination conditions. Improved stability during absorption/regeneration cycling show that $CaO/Ca_{12}Al_{14}O_{33}$ material obtained via decomposition of $Ca_3Al_2O_6$ has a great potential for applications with high temperature $CO_2$ sorption.

The developed synthesis route offers the possibility to tailor the final composition of the material by adjusting the stoichiometry in the precursor's solution. Introduction of 20 wt % excess CaO in relation to the $Ca_3Al_2O_6$ phase improved the total $CO_2$ capacity without modifying the chemical stability of the formed sorbent. Introduction of nickel nitrate salt in the solution was shown to form homogeneously dispersed nano particles of NiO on the surface of the sorbent that could be easily reduced to active Ni metal in H2 rich gas flux at high temperature without modifying the structure of the $CO_2$ sorbent.

Finally, the compaction of the powder synthesized according to the invention was shown to form a partly sintering ceramic material with improved mechanical properties. Because of the decomposition of the $Ca_3Al_2O_6$ phase and a partial sintering of the formed $Ca_{12}Al_{14}O_{33}$, a porous ceramic matrix was obtained. Because of the high porosity of the particles, excess CaO, CaO formed during decomposition of $Ca_3Al_2O_6$ and NiO are easily accessible to gas for gas-solid reactions such as reforming of hydrocarbon rich gases and $CO_2$ absorption.

REFERENCES

[1] Harrison, D. P. The role of solids in $CO_2$ capture: A mini review, Greenhouse Gas Control Technologies 7, 2005, 1101-1106.
[2] Abanades, J. C., Anthony, E. J., Lu, D. Y., Salvador, C. and Alvarez, D. Capture of $CO_2$ from combustion gases in a fluidized bed of CaO. AlChE Journal, 50:1614-1622, 2004a.
[3] Abanades, J. C., Rubin, E. S. and Anthony, E. J. Sorbent cost and performance in CO2 capture systems. Industrial & Engineering Chemistry Research, 43:3462-3466, 2004b.
[4] Abanades, J. C. and Alvarez, D. Conversion limits in the reaction of CO2 with lime. Energy & Fuels, 17:308-315, 2003.
[5] Grasa, G.; Abanades, J. C. CO2 Capture Capacity of CaO in Long Series of Carbonation/Calcination Cycles. Industrial and Engineering Chemistry Research 2006, 45, 8846-51
[6] Green, D. A., Turk, B. S., Gupta, R. P., Portzer, J. W., McMichael, W. J., Harrison, D. P. Capture of carbon dioxide from flue gas using solid regenerable sorbents. Int. Journal of Environmental Technology and Management, 4:53-67, 2004.
[7] Baker, E. H. The calcium oxide-carbon dioxide system in the pressure range 1-300 atmospheres. *J. Chem. Soc.* 1962, 464.
[8] Alvarez, D., Abanades, J. C., 2005b. Pore-size and shape effects on the recarbonation performance of calcium oxide submitted to repeated calcinations/recarbonation cycles. Energy & Fuels 19, 270-278.
[9] J. S. Dennis and R. Pacciani, The rate and extent of uptake of $CO_2$ by a synthetic, CaO-containing sorbent, Chemical Engineering Science, Volume 64, Issue 9, 1 May 2009, Pages 2147-2157
[10] Lu H., Smirniotis P. G., Ernst F. O. and Pratsinis S. E., Nanostructured Ca-based sorbents with high $CO_2$ uptake efficiency. Chemical Engineering Science, Volume 64, Issue 9, 1 May 2009, Pages 1936-1943.
[11] Florin N. H., Harris A. T., Reactivity of CaO derived from nano-sized $CaCO_3$ particles through multiple $CO_2$ capture-and-release cycles. Chemical Engineering Science, Volume 64, Issue 2, January 2009, Pages 187-191.
[12] Lu H., Reddy E. P., and Smirniotis P. G., Calcium Oxide Based Sorbents for Capture of Carbon Dioxide at High Temperatures. Ind. Eng. Chem. Res. 2006, 45, 3944-3949.
[13] Muñoz-Guillena M. J., Macías-Pérez M. C., Linares-Solano A., Salinas-Martínez de Lecea C., CaO dispersed on carbon as an $SO_2$ sorbent. Fuel, Volume 76, Issue 6, May 1997, Pages 527-532
[14] Feng B., Liu W., Li X., and An H. Overcoming the Problem of Loss-in-Capacity of Calcium Oxide in CO2 Capture Energy & Fuels 2006, 20, 2417-2420
[15] Li Z.-S., Cai N.-S., Huang Y.-Y, and Han H-J. Synthesis, Experimental Studies, and Analysis of a New Calcium-Based Carbon Dioxide Absorbent. Energy & Fuels, 2005, 19, 1447-1452.
[16] Wu S. F., Li Q. H., Kim J. N., and Yi K. B. Yi\ Properties of a Nano CaO/Al2O3CO2 Sorbent *Ind. Eng. Chem. Res.* 2008, 47, 180-184
[17] Martavaltzi C. S., Lemionidou A. A., Parametric Study of the CaO—Ca12Al14O33. Synthesis with respect to high CO2 sorption capacity and stability on multicycle operation. Industrial And Engineering Chemistry Research, 2008, 47, 23, 9537-9543.
[18] Martavaltzi C. S., Lemionidou A. A., Development of new CaO based sorbent materials for $CO_2$ removal at high temperature. Microporous and Mesoporous Materials Volume 110, Issue 1, 1 Apr. 2008, Pages 119-127.
[19] Hughes R. W., Lu D., Anthony E. J. and Wu Y., Improved Long-Term Conversion of Limestone-Derived Sorbents for In Situ Capture of CO2 in a Fluidized Bed Combustor. Ind. Eng. Chem. Res. 2004, 43, 5529-5539.

The invention claimed is:
1. A method for preparing a particulate, heterogeneous, solid, $CO_2$ absorbent composition for use in chemical processing, the method comprising:
providing a raw material comprising $Ca_3Al_2O_6$; and
heating the raw material to a temperature between 500° C. and 925° C. in the presence of $H_2O$ and $CO_2$ for a period of time sufficient to allow the raw material to react and form the particulate, heterogeneous, solid, $CO_2$ absorbent composition.
2. The method as claimed in claim 1, wherein a ratio of CaO to $Ca_{12}Al_{14}O_{33}$ in the composition is from 25 to 45% by weight.
3. The method as claimed in claim 1, wherein a ratio of CaO to $Ca_{12}Al_{14}O_{33}$ in the composition is from 26.7 to 41% by weight.
4. The method as claimed in claim 1, wherein the source of calcium and aluminium is at least partially in the form of a nitrate solution.
5. The method as claimed in claim 1, wherein the raw material comprising $Ca_3Al_2O_6$ is compacted and optionally agglomerated in order to obtain the particulate, heterogeneous, solid, $CO_2$ absorbent composition having a desired mechanical stability, crushing strength or resistance to attrition.
6. The method as claimed in claim 1, further comprising adding a catalytically active material so that catalytically active particles are present on the surface of the particulate heterogeneous, solid, $CO_2$ absorbent composition.
7. The method as claimed in claim 6, wherein the catalytically active material is selected from the group consisting of Ni, Co, Fe, Cr, Cu, Zn, Pt, Pd, Rh, Ru, Ir, and combinations thereof.
8. The method as claimed in claim 6, wherein the catalytically active material is added subsequent to the formation of the particulate, heterogeneous, solid, $CO_2$ sorbent composition by means of an impregnation technique.
9. The method as claimed in claim 1, wherein the step of providing a raw material comprising $Ca_3Al_2O_6$, comprises providing a source of calcium and aluminium ions mixed in solution and to dry the solution by heating it to a temperature in the range 100-400° C. for a period of 8-15 hours in the presence of a chelating agent and a polymerizing agent to form a solid precursor and to heat the precursor to a temperature in the range 500 to 850° C. to burn any organic compounds present in the precursor and to heat the resulting powder to a temperature in the range 900-1100° C. for a period of 5 to 30 hours to form an oxide powder comprising $Ca_3Al_2O_6$.
10. The method as claimed in claim 9, wherein the aluminium and calcium for the source of their ions are extracted from a naturally occurring mineral or rock.

11. The method as claimed in claim 10, wherein the naturally occurring mineral or rock is at least one of anorthosite and calcite.

\* \* \* \* \*